E. LOGARZO.
MAIZE OR INDIAN CORN HARVESTING MACHINE.
APPLICATION FILED NOV. 18, 1916.
1,351,665.
Patented Aug. 31, 1920.
4 SHEETS—SHEET 1.
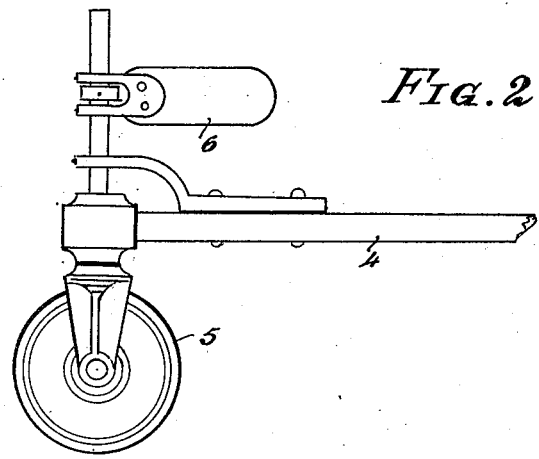
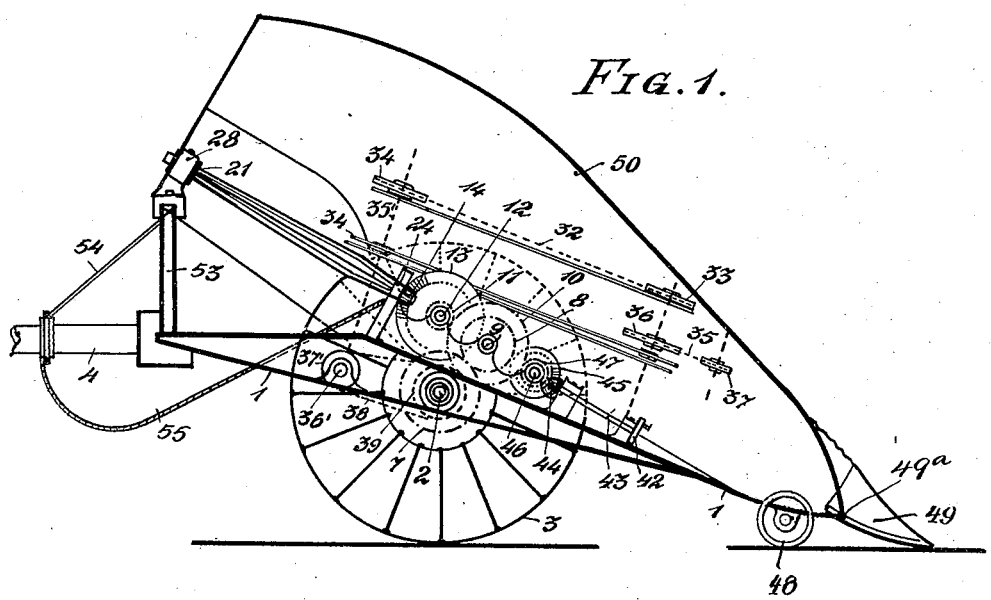
Witnesses:
Joseph Nagy
G. L. Beeler
E. Logarzo
Inventor
By his Attorneys

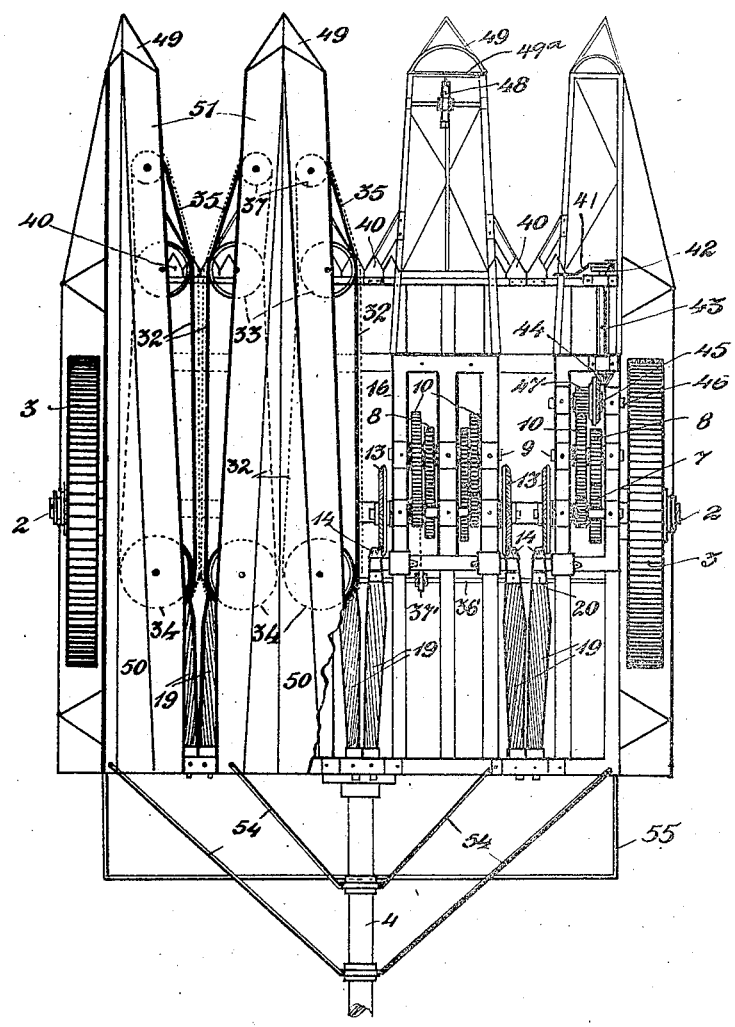

E. LOGARZO.
MAIZE OR INDIAN CORN HARVESTING MACHINE.
APPLICATION FILED NOV. 18, 1916.
1,351,665.
Patented Aug. 31, 1920.
4 SHEETS—SHEET 3.
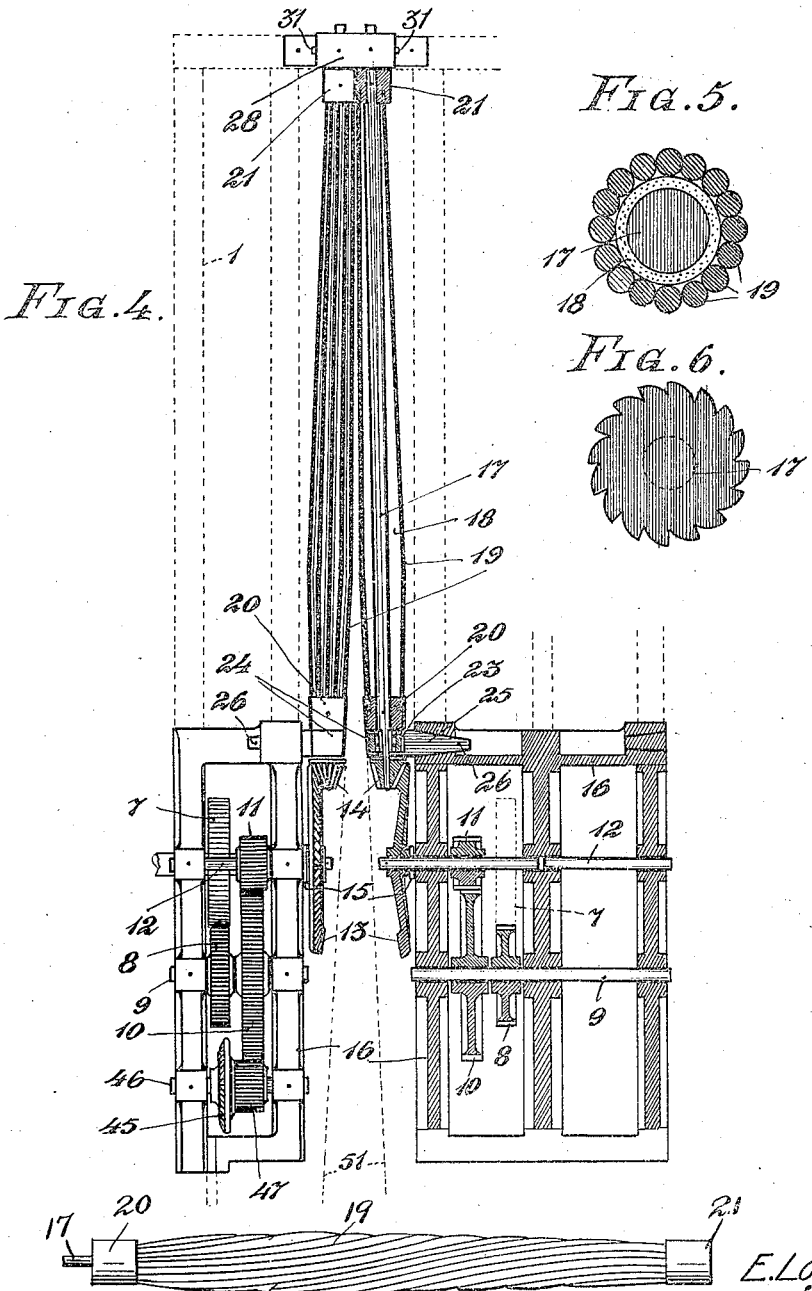

E. LOGARZO.
MAIZE OR INDIAN CORN HARVESTING MACHINE.
APPLICATION FILED NOV. 18, 1916.

1,351,665.

Patented Aug. 31, 1920.
4 SHEETS—SHEET 4.

UNITED STATES PATENT OFFICE.

EMILIO LOGARZO, OF BUENOS AIRES, ARGENTINA.

MAIZE OR INDIAN-CORN HARVESTING MACHINE.

1,351,665.  Specification of Letters Patent.  Patented Aug. 31, 1920.

Application filed November 18, 1916. Serial No. 131,989.

*To all whom it may concern:*

Be it known that I, EMILIO LOGARZO, a citizen of the Argentine Republic, residing at Calle Maipú 671, Buenos Aires, Argentine Republic, have invented new and useful Improvements in Maize or Indian-Corn Harvesting Machines, of which the following is a specification.

This invention relates to a new maize or Indian corn harvesting machine, characterized by the special construction and arrangement of the husking means constituted substantially by a pair of bi-conical cylinders placed at an angle, and the surface of each of which is grooved or fluted in parallel direction to its axis, or in a helicoidal direction. Said cylinders are actuated independently in opposite directions and are so mounted that starting from the normal angular separation they can be distanced as may be required by the diameter of the plants which are caused to pass through them to effect the removal of the husked ears.

As will be seen further on, said means are mounted obliquely in combination with means for cutting the plant and means for conveying and presenting it to the cylinders. The movement of the machine as a whole is obtained by means of a gearing driven by the axle of the transportation wheels, the machine being propelled by animal or mechanical power.

For the better understanding of this invention, I attach hereto drawings in which:

Figure 1 is a side elevation partly in section of a maize or Indian corn harvesting machine, constructed according to this invention;

Fig. 2 is a view showing the rear part of the pole of said machine, on which the steering wheel is mounted;

Fig. 3 is a plan view of said machine;

Fig. 4 is a detail of the harvesting cylinders, one of which is illustrated in a longitudinal central section;

Fig. 5 illustrates the section of one of the cylinders;

Fig. 6 shows a variation in the construction and sectional form of said cylinders;

Fig. 9 is a side elevation of one of the helicoidal husking rollers.

Figure 7:
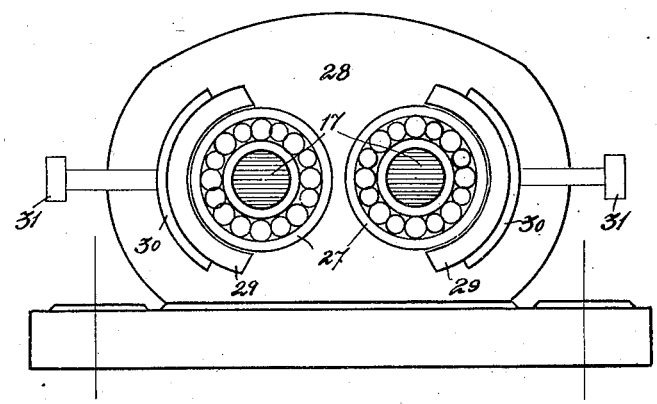
Figs. 7 and 8 are details of the rear and front bearings, respectively, in which the cylinders are mounted.

In said drawings, 1 is the frame on which the whole of the machine is mounted, and which is supported on a rotary axle 2 on the ends of which are loosely mounted the wheels 3, the movement of which is transmitted to the axle by means of a suitable clutch. Said frame is propelled from the rear by means of a pole 4 at the end of which is mounted the steering wheel 5 in combination with the customary accessories of control 6, and the doubletree and singletrees to which the animals are harnessed.

The machine shown in the drawings is designed for harvesting in three rows at a time. The means employed for each row are identical, and therefore the construction, as to the number of rows to be operated upon by the machine, may be increased or decreased without departing from the spirit and scope of the invention.

It is also understood that a platform can be placed at any convenient place in the machine, and on said platform there may be placed a motor of a suitable system and power to effect the moving and working of the machine.

As aforesaid, the axle 2 may be connected, at will, with the wheels 3 with the object of moving the machine from one place to another as a common vehicle, when not at work.

Said axle 2 carries a number of gear wheels 7, equal to the number of cylinders comprised by the machine, in order that each one of the latter may be operated independently.

The gears 7 mesh with the gears 8, the axles 9 of which have a second wheel 10 of a greater diameter which meshes with the corresponding wheel 11 mounted on a shaft 12 which may be displaced axially and carries at one of its ends a beveled gear 13 which meshes with the corresponding beveled pinion 14 secured to the front end of each harvesting cylinder. The back portions of the beveled gears 13 bear against resilient rings or cushions 15 which allow them an axial displacement to compensate for the displacement of the cylinders, caused by the varying diameter of the plants.

Each one of the above mentioned gearings is placed in a support 16 conveniently held on the frame 1. All the axles rotate in ball or anti-friction bearings.

The bi-conical cylinders which form each harvesting pair are constituted by an axle 17 provided with a suitable coating 18 of rubber, on which rest the rods 19 which form the fluted periphery of same. Said rods, at the front end, are secured to the flanges or heads 20 while, at the rear end, they are secured to the flanges or heads 21, both keyed on to the corresponding axle. Upon each axle 17 a short distance from its forward end is a ring 18' having peripheral grooves which receive the rods 19, and by means of which the bi-conical form is given to the cylinder.

Figure 8:
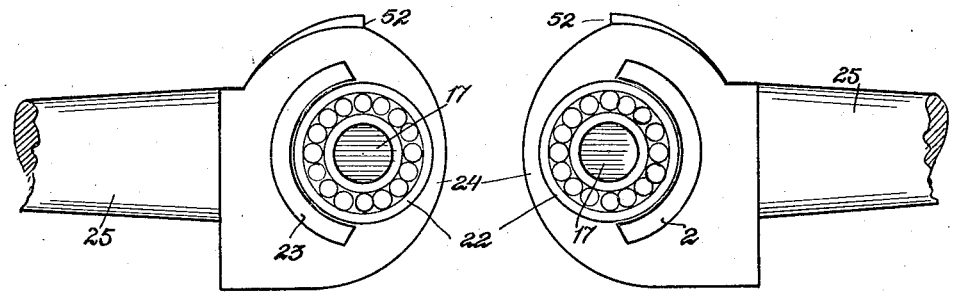

In Fig. 4 of the drawings, said rods are shown in a position normal to the axle, by which there is obtained a surface fluted in axial direction. In order to obtain said surface fluted in a helicoidal direction, as shown in Fig. 9, one of the flanges or heads 20 or 21 is caused to turn, according to the desired pitch, one quarter or more of a turn, and is then keyed in position. The sectional shape of the rods may be circular as shown, or of any other convenient geometrical form. As shown in Fig. 6, the construction of the cylinders may vary, making them solid presenting either straight or helicoidal grooves, and the shape of the projections which form them may be that shown or any other. Whatever may be the sectional shape and the construction of said pairs of cylinders, see Figs. 4, 7 and 8, the axle of the same, at its front end, works in a bearing of steel balls 22, in combination with the elastical material 23 to allow the lateral displacement caused by the different diameters of the plants. The castings 24 in which said bearings are held, are fixed to the supports 16 by means of the corresponding conical pins 25, the end of each of which has a hole 26 which allows the placing of the key which holds it in place. The rear end of the axle of each cylinder works in the corresponding ball bearing 27, both conveniently mounted on a casting 28 and combined with elastic material 29 against which bears a plate 30 actuated by the corresponding set screw 31. On account of the arrangement of the elastic materials 23 and 29 in the front and rear bearings, and also of the elastic rings 15 of wheels 13, the cylinders may come together or be separated as required by the diameter of the plants.

The bi-conical shape and the angular position of the cylinders to each other, leaves at the front portion of them a space sufficiently ample to accommodate the stalk considered as the greatest usual size of maize or Indian corn plants.

The plants are presented to the cylinders by means of the pairs of endless cables 32 which run on the front and rear pulleys 33 and 34, the tension of which is regulated by the central cable 35 which runs over the pulleys 36 and 37, and which at the same time forms the angular opening which guides the plants to be presented in suitable position to the cutter and the pairs of cables 32. The rear pulleys 34 are actuated by the corresponding axle 35', which is actuated by the axle 36' through conical gears. The axle 36' carries the pulleys or sprocket wheels 37' actuated by chains 38 which transmit the movement of wheels 39 secured on the driving axle 2.

The cutting means 40 may be constituted by cutter-bar knives as usual, or any other convenient means. The movement is transmitted by the arms 41 actuated by the eccentric plates 42 placed one on each side of the machine and secured to the corresponding shaft 43. Each one of these shafts is actuated independently by a conical pinion 44 which meshes with the wheel 45 secured on shaft 46 which, by means of the gear wheel 47, receives the movement of wheel 10 on axle 9.

The front part of the machine rests on wheels 48 mounted on the rigid ends of the frame, which as seen in Figs. 1 and 3, form four spaced extensions and in these several spaces the conducting cables and the cylinders are presented. To the ends of said extensions shoes 49 are hinged at 49ª the object of which is to raise the plants which might be lying in the furrow.

The whole of the machine is covered by the casing 50, formed in four sections between each adjacent two of which there is an angular space limited by the walls 51 which, starting from the end extensions of the frame converge toward the entrance of the cylinders at which point a lug 52 (Fig. 8) formed by the castings 24 of the bearings 22, serve as fastening means, the walls of the casing then extending in parallel direction and at a higher level toward the top end of the cylinders, which part is supported by the walls 53 rigidly held by the braces 54. There is nothing new about the casing it being a conventional form of casing. A hopper 55 receives the harvested ears through each pair of cylinders, and they may be withdrawn from said hopper and put in bags, by any convenient means.

The general operation of the machine is as follows:

As aforesaid, the machine is propelled from the rear either by animal or mechanical power.

When the machine is advancing, the movement of the wheels 3 is transmitted by the already mentioned mechanisms to the cutting means, the transporting means and to the cylinders.

In operation, the extensions of the frame pass on opposite sides of the rows of plants and those which may be lying down will be successively raised by the shoes 49 and will be guided by said extensions until they are taken hold of by the cables 32 at which time the knives 40 will cut the stalks.

The plants so cut, are transported by the aforesaid pairs of cables 32 toward the harvesting cylinders, being received by these and forced to pass between them on account of their rotary movement in opposite direction.

The stalks are moved rearwardly and downwardly and when the ear reaches the cylinders, owing to the speed of the cylinders and the elastic pressure at the base of the cob, the ear is forced out of the husk without injury thereto, and deposited in the hopper 55, the stalks with the husk being deposited on the ground.

As will be seen by Fig. 1, the inclination of the cylinders with respect to the plane of the ground, is greater than that of the cables 32. This arrangement has for its object to provide that the plants are presented with such an inclination that when they are gripped by the cylinders, said position and the action of the cylinders on the ears will tend, during their passage, to transport them toward the rear part of the same, thus leaving the entrance free for the plants which are successively presented.

It is obvious that the speed of the cylinders and the inclination at which the plants are delivered, will be calculated so that the plant considered as that of the greatest possible height, may pass totally through the cylinders before arriving at the rear end of them.

The pairs of transporting cables 32 may be of elastic material or simply cords or chains, either smooth or corrugated, and provided or not with carrying barbs.

Said cylinders, however, may also be of solid iron or any other convenient material, as shown in Fig. 6, and it is also to be understood that the longitudinal shape may be simply cylindrical or bi-conical as shown.

Claims.

1. In a corn harvesting machine, the combination of a supporting frame, driving wheels for the frame, means carried by the front portion of the frame to gather fallen plants, a plurality of endless devices to receive the plants and carry them rearwardly with respect to the machine, cutting devices to sever the plants from the ground, and a plurality of coöperating biconical rollers to remove the husks therefrom, said rollers having yielding fluted surfaces and operating in a plane different from the plane in which the endless devices operate.

2. In a corn harvesting machine, the combination of a frame, supporting and propelling wheels therefor, said frame being subdivided into several parts for the accommodation of a plurality of rows of plants, means carried by the frame to gather and elevate fallen plants, a plurality of endless carriers coöperating with each row and serving to transport the same rearwardly with respect to the line of movement of the machine, cutting devices to sever the plants from the ground, a pair of biconical rollers having helicoidal and yielding fluted surfaces and receiving the plants from the carrier means, means for yieldingly mounting said rollers, and means to operate each pair of rollers at high speed in opposite directions to cause the plants to be carried rapidly downwardly therethrough for the husking of the ear.

3. In a corn harvesting machine, the combination of a rigid frame, supporting wheels therefor, a plurality of shoes hinged to the front portion of the frame and in engagement with the ground for gathering and elevating fallen plants, a pair of endless receiving bands for each row of plants delivering the same rearwardly with respect to the frame, cutting devices below the rear portions of said receiving bands, a pair of conveying bands extending rearwardly of the first endless bands for transporting the severed plants rearwardly, a pair of fluted rollers receiving the plants from the carriers, means to operate the rollers at high speed to cause the plants to be delivered between the same to husk the ears, and resilient supports for the ends of the rollers permitting movement thereof toward and from each other.

4. In a corn harvesting machine, a wheel supported frame having at its front-end spaced members to pass on opposite sides of a row of plants, a pair of longitudinally extending bi-conical fluted rollers at the rear of the frame, and two endless cables carried by each member of the frame and arranged one above the other, said cables projecting into the space between the members and extending above and beyond the front ends of the husking rollers, the husking rollers and cables being inclined forwardly, and the inclination of the rollers being greater than that of the cables, as and for the purpose set forth.

5. In a corn husking machine an inclined wheel supported frame having at its forward end spaced members to pass on opposite sides of a row of plants, a pair of longitudinally extending bi-conical fluted rollers at the rear of the frame, a pair of endless belts carried by each member of the frame and extending above and over the front ends of the husking rollers, and an endless cable carried by each member of the frame and extending in front of the first cables, said cables diverging from each other and serving to guide the plants to the first named cables.

6. In a corn husking machine, a frame, a pair of husking rollers, yielding bearings for the husking rollers, pinions on the front ends of the rollers, yieldingly mounted gear wheels meshing with the pinions of the husking rollers and means for operating the said gear wheels.

7. In a corn harvesting machine, a wheel supported frame, a pair of coöperating fluted rollers, means for operating the rollers, a cutter for cutting the stalks, a pair of endless bands for guiding the stalks to the cutter, pairs of endless bands extending rearwardly of the first pair of bands for delivering the cut stalks to the rollers, and means for operating said bands from the axle of the wheels.

EMILIO LOGARZO.

Witnesses:
H. RUCKELS,
ROSENDO ROMAN.